(12) United States Patent
Tannhäuser

(10) Patent No.: US 11,309,805 B2
(45) Date of Patent: Apr. 19, 2022

(54) INVERTER AND PHOTOVOLTAIC INSTALLATION

(71) Applicant: Marvin Tannhäuser, Möhrendorf (DE)

(72) Inventor: Marvin Tannhäuser, Möhrendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/690,546

(22) Filed: Aug. 30, 2017

(65) Prior Publication Data

US 2018/0062538 A1 Mar. 1, 2018

(30) Foreign Application Priority Data

Aug. 31, 2016 (DE) .......................... 102016216375.2

(51) Int. Cl.
| | |
|---|---|
| *H02M 7/487* | (2007.01) |
| *H02M 1/00* | (2006.01) |
| *H02M 7/483* | (2007.01) |
| *H02J 3/38* | (2006.01) |
| *H02M 1/44* | (2007.01) |

(52) U.S. Cl.
CPC ............. *H02M 7/487* (2013.01); *H02J 3/383* (2013.01); *H02M 1/007* (2021.05); *H02M 1/008* (2021.05); *H02M 1/44* (2013.01); *H02M 7/483* (2013.01)

(58) Field of Classification Search
CPC ........ H02M 7/487; H02M 1/007; H02M 1/44; H02M 1/008; H02M 7/483; H02J 3/383
See application file for complete search history.

(56) References Cited

U.S. PATENT DOCUMENTS

| | | | | |
|---|---|---|---|---|
| 8,564,990 | B2* | 10/2013 | Haderli | H02M 7/483 |
| | | | | 363/65 |
| 9,030,854 | B2* | 5/2015 | Escobar | H02M 7/42 |
| | | | | 363/40 |
| 9,812,984 | B2* | 11/2017 | Yoscovich | H02J 3/38 |
| 9,906,169 | B1* | 2/2018 | Isurin | H02M 7/72 |
| 10,063,142 | B2 | 8/2018 | Kaiser et al. | |
| 2009/0168467 | A1 | 7/2009 | Schmidt et al. | |
| 2011/0103118 | A1* | 5/2011 | Serpa | H02M 3/158 |
| | | | | 363/132 |
| 2013/0193765 | A1 | 8/2013 | Yoscovich | |

(Continued)

FOREIGN PATENT DOCUMENTS

| | | |
|---|---|---|
| CN | 102055316 A | 5/2011 |
| CN | 102257718 A | 11/2011 |

(Continued)

OTHER PUBLICATIONS

German Research Report for German Application No. 102017215133.1, dated Jul. 12, 2018.

(Continued)

*Primary Examiner* — Jue Zhang
(74) *Attorney, Agent, or Firm* — Lempia Summerfield Katz LLC

(57) ABSTRACT

An inverter that is a micro-photovoltaic inverter includes a DC-DC converter on an input side of the inverter. The DC-DC converter has three output voltage levels. The inverter also includes an inverter element having at least three input voltage levels. The inverter element is electrically connected to the DC-DC converter.

17 Claims, 5 Drawing Sheets

(56) References Cited

U.S. PATENT DOCUMENTS

| | | | | | |
|---|---|---|---|---|---|
| 2013/0200715 | A1* | 8/2013 | Pettersson | ............. | H02M 7/537 307/82 |
| 2016/0118910 | A1* | 4/2016 | Torrico-Bascope | .. | H02M 7/487 363/131 |
| 2016/0172863 | A1* | 6/2016 | Robbins | .................. | H02S 40/34 323/234 |
| 2017/0185130 | A1* | 6/2017 | Zhang | ..................... | G06F 1/324 |
| 2017/0288574 | A1* | 10/2017 | Agirman | ............... | H02M 7/487 |

FOREIGN PATENT DOCUMENTS

| | | | |
|---|---|---|---|
| CN | 103227475 | A | 7/2013 |
| CN | 103248209 | A | 8/2013 |
| CN | 103490655 | A | 1/2014 |
| CN | 105322796 | A | 2/2016 |
| DE | 102006012164 | A1 | 7/2007 |
| DE | 102012107122 | A1 | 2/2013 |
| DE | 102014203157 | A1 | 8/2015 |

OTHER PUBLICATIONS

Chinese Office Action for Chinese Application No. 201710770908.4 dated Jan. 13, 2020.

Zhu Jingwei; "Annex: Evidence of the State of the Art: Principle of Frequency Conversion and Speed Control of AC Motors", Dalian Maritime University Press, Mar. 2014, pp. 48-49; 2014.

Chinese Office Acfion for Chinese Application No. 201710770908.4 dated Apr. 30, 2019.

\* cited by examiner

INVERTER AND PHOTOVOLTAIC INSTALLATION

This application claims the benefit of DE 10 2016 216 375.2, filed on Aug. 31, 2016, which is hereby incorporated by reference in its entirety.

BACKGROUND

The present embodiments relate to an inverter and a photovoltaic installation.

In photovoltaic installations, a micro-photovoltaic inverter (MPI) is typically electrically connected to a photovoltaic module that provides a DC voltage (DC) of approximately 20V-50V during operation. The MPI converts the DC voltage to an AC voltage so that the MPI feeds, for example, 230V and 50 Hz to the grid.

It is known to configure micro-photovoltaic inverters with two stages. A first stage of a micro-photovoltaic inverter is formed with a DC/DC converter, which is configured as a transformer-type transducer in a manner known per se. The input side and the output side of the transformer-type transducer are DC-isolated from one another. The DC/DC converter generates a significantly higher DC voltage at an output than at an input. The DC voltage may be over 400V. In order to generate this high DC voltage from a low DC voltage of approximately 20V, a voltage transformation ratio of more than 20 is to be provided. Such a voltage transformation ratio may only be realized effectively using a transformer-type transducer, not using a non-isolating transducer.

As the second stage, the MPI has a DC/AC inverter, which is often embodied as a simple full bridge. This stage generates an AC voltage from the high DC voltage provided by the DC/DC converter by appropriate pulse-width modulation (PWM). The AC voltage is then able to be fed to the grid via an EMI filter.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved inverter that may be operated in a more cost-effective, compact, and efficient manner is provided.

The inverter according to one or more of the present embodiments may be a micro-photovoltaic inverter. In accordance with an embodiment, an input side of the inverter includes a DC-DC converter having three output voltage levels. The inverter also includes an inverter element having at least three input voltage levels. The inverter element is electrically connected to the DC-DC converter.

The inverter in accordance with one or more of the present embodiments may be configured with a transformerless topology. The inverter according to one or more of the present embodiments may also be configured in a transformerless manner. Transformerless DC-DC converters have a higher degree of efficiency compared to transformer-type DC-DC converters. The inverter according to one or more of the present embodiments may also be produced in a cost-effective manner, since a transformer-type DC-DC converter frequently constitutes an expensive component that may be dispensed with in accordance with the present embodiments. The inverter according to one or more of the present embodiments may also be configured in a compact manner, since a transformerless DC-DC converter may frequently be configured with a smaller installation space than a transformer-type DC-DC converter.

In a development of the inverter according to one or more of the present embodiments, the DC-DC converter on the input side has an inverting DC-DC converter and a non-inverting DC-DC converter as components.

In an embodiment, the non-inverting DC-DC converter and the inverting DC-DC converter may be operated in an interleaved clocking mode. This doubles the effective switching frequency at the DC input of the inverter. A relatively small EMC filter at the DC input is sufficient (e.g., every MPI uses an EMC filter (not explicitly shown in the drawings in this application) at the DC input). In addition, the passive components of the EMI filter may be smaller due to the relatively high switching frequency, which saves costs and physical size.

In the inverter according to one or more of the present embodiments, the inverting DC-DC converter and the non-inverting DC-DC converter may be dimensioned for output voltages that differ from one another by, for example, not more than 20 percent, by not more than 3 percent, or by not more than 0.5 percent.

In the inverter according to one or more of the present embodiments, the inputs of the inverting DC-DC converter and the non-inverting DC-DC converter may be able to be fed such that the inputs of the inverting DC-DC converter and the non-inverting DC-DC converter have different polarities and, for example, an equal magnitude and may be contact-connected accordingly.

In a development of the inverter, the non-inverting DC-DC converter includes a boost converter, and/or the inverting DC-DC converter includes a buck-boost converter.

In the inverter according to one or more of the present embodiments, the inverter element may have three phase legs for three-phase output voltages. Each of the phase legs is configured to be able to be fed with three input voltage levels. In the inverter according to one or more of the present embodiments, the phase legs may, for example, be configured in or with the ANPC type or NPC type or 3L-T type.

In a development, in the inverter, the inverter element is an inverter element of extended active neutral point clamped (extended-ANPC) design.

The inverter according to one or more of the present embodiments may have two DC link capacitors that are arranged and interconnected to isolate the three output voltage levels of the DC-DC converter on the input side from one another.

The inverter according to one or more of the present embodiments may be produced using a divided DC link having a separate supply for a first (e.g., upper) DC link capacitor and a second (e.g., lower) DC link capacitor. The divided DC link enables a three-level inverter element to be used unconditionally as a component of the inverter according to present embodiments.

The DC link capacitors may be easily balanced by the DC-DC converter that may be present on the input side.

The photovoltaic installation according to an embodiment has a photovoltaic module and a micro-photovoltaic inverter electrically connected thereto. The micro-photovoltaic inverter is formed with an inverter or as an inverter, as described above.

DETAILED DESCRIPTION

Figure 1:
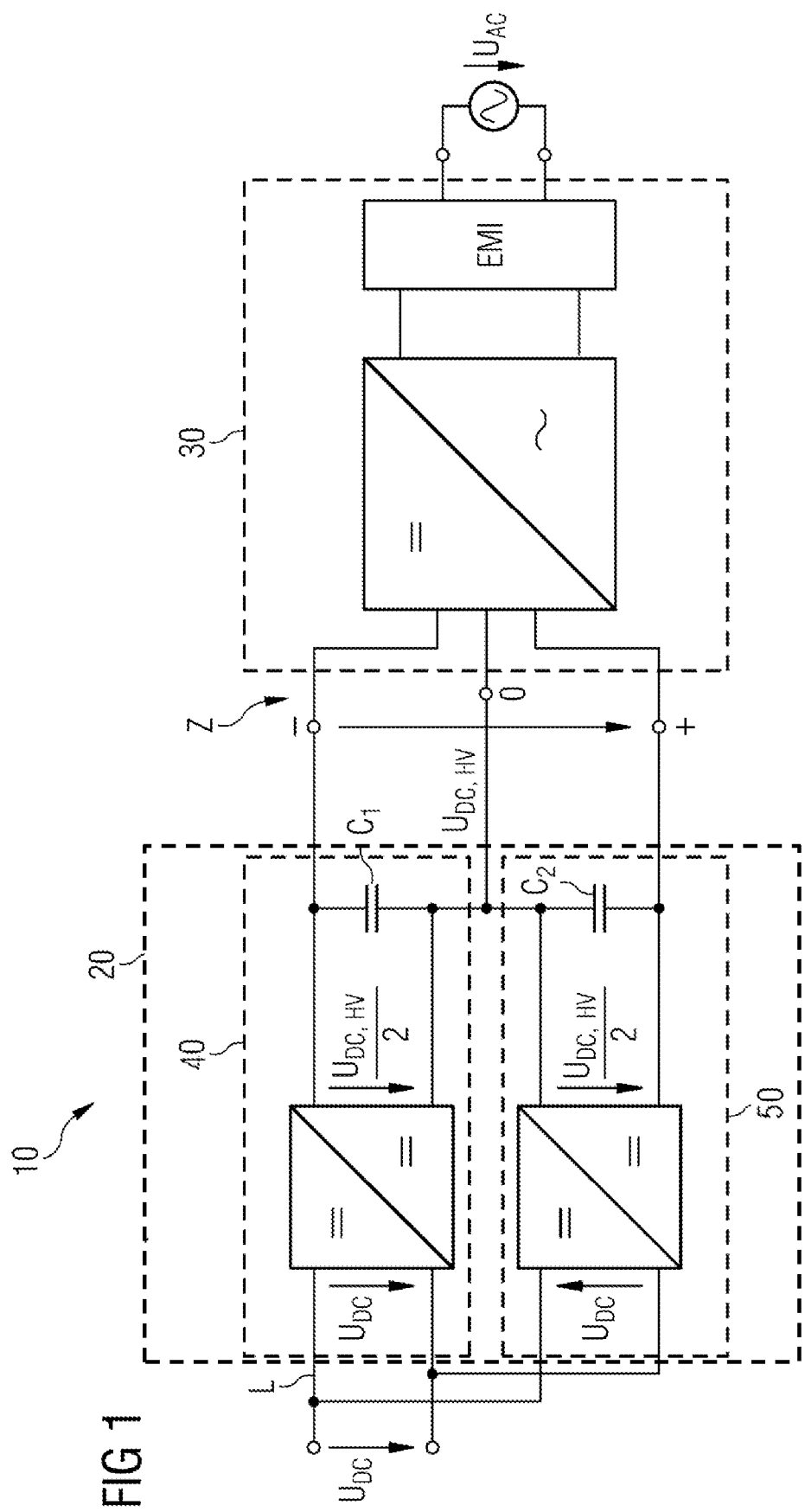
FIG. 1 schematically shows the basic design of an inverter according to an embodiment in a block diagram.

The basic design of an inverter 10 according to one or more of the present embodiments, illustrated in FIG. 1, includes a DC-DC converter 20 on an input side. The DC-DC converter is fed with an input voltage $U_{DC}$ by electrical connection lines L that are connected to the input of the DC-DC converter 20. In the exemplary embodiment illustrated, the inverter 10 is configured for an input voltage $U_{DC}$ of 20 to 50 volts.

An output side of the DC-DC converter outputs 3 voltage levels to a DC link Z. The 3 voltage levels differ from one another by the high-voltage differences $U_{DC,HV}/2$. In FIG. 1, the DC link Z includes a zero potential (denoted by "0") in the center, a potential (denoted by "−") at the top, which is negative compared to the zero potential, and a potential (denoted by "+") at the bottom, which is positive compared to the zero potential. The zero potential, the potential at the top, and the potential at the bottom are isolated from one another by DC link capacitors C1, C2. There is therefore a voltage $U_{DC,HV}$ between the positive potential and the negative potential. The DC link Z couples the DC-DC converter 20 to an inverter element 30. The inverter element 30 is fed with the three voltage levels "−", "+", "0" as input voltages for the inverter element 30 and is configured as a three-level converter. An output side of the inverter element 30 provides an AC voltage $U_{AC}$ across the EMI filter EMI. The AC voltage in the exemplary embodiment shown is 230 volts at a frequency of 50 Hz and is therefore able to be fed directly to the grid without further conversion.

The DC-DC converter 20 is formed by a non-inverting DC-DC converter 40 and by an inverting DC-DC converter 50 as components of the DC-DC converter 20. The non-inverting DC-DC converter 40 and the inverting DC-DC converter 50 are in this case jointly fed by the same DC voltage $U_{DC}$. The DC voltage $U_{DC}$ is applied to the non-inverting DC-DC converter 40 directly and to the inverting DC-DC converter 50 in an inverted manner such that the non-inverting DC-DC 40 converter 40 and the inverting DC-DC converter 50 have different polarities.

On the DC link side, the higher of the output potentials of the non-inverting DC-DC converter 40 and the lower of the output potentials of the inverting DC-DC converter 50 are combined and form the zero potential of the DC link Z. The other potentials of the non-inverting DC-DC converter 40 and the inverting DC-DC converter 50 form the potential "−" that is negative compared to the zero potential and the potential "+" that is positive compared to the zero potential.

Figure 2:
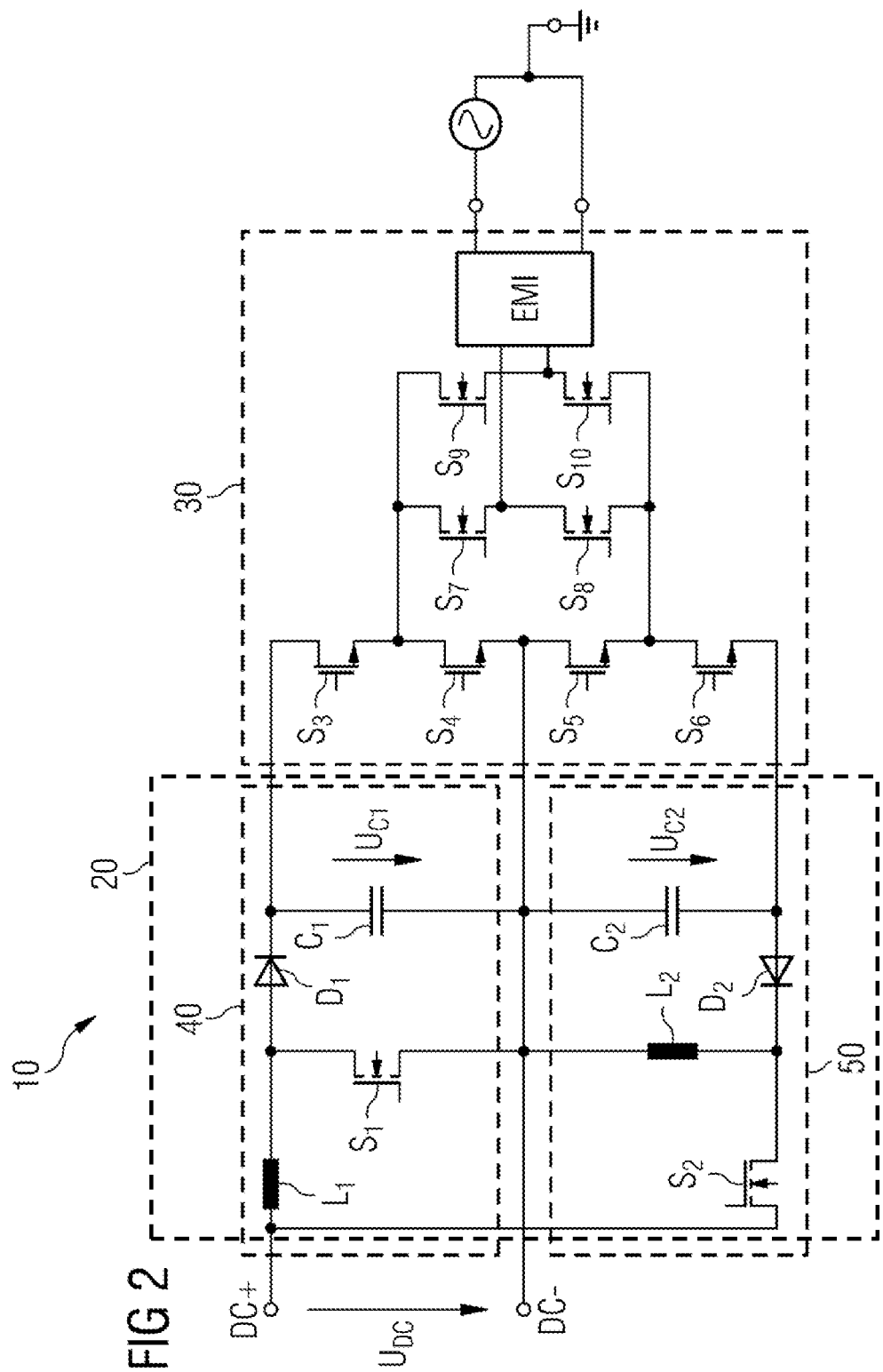
FIG. 2 schematically shows a first exemplary embodiment of the inverter according to an embodiment in a circuit outline.

The precise design of the DC-DC converter 20 and the inverter element 30 in a first exemplary embodiment emerges from FIG. 2, as follows. The non-inverting DC-DC converter 40 is configured as a boost converter, which is formed, in a manner known per se, by an inductance L1, a metal-oxide-semiconductor field-effect transistor (MOSFET) S1, a diode D1, and a capacitor C1.

The inverting DC-DC converter 50 is configured as a buck-boost converter, which is formed, in a manner known per se, by an inductance L2, a MOSFET S2, a diode D2, and a capacitor C2.

The three-level converter 30 is embodied in an extended active neutral point clamped (extended-ANPC) design, which includes, in a manner known per se, MOSFETs $S_3$, $S_4$, ... $S_{10}$, and an EMI filter.

Figure 3:
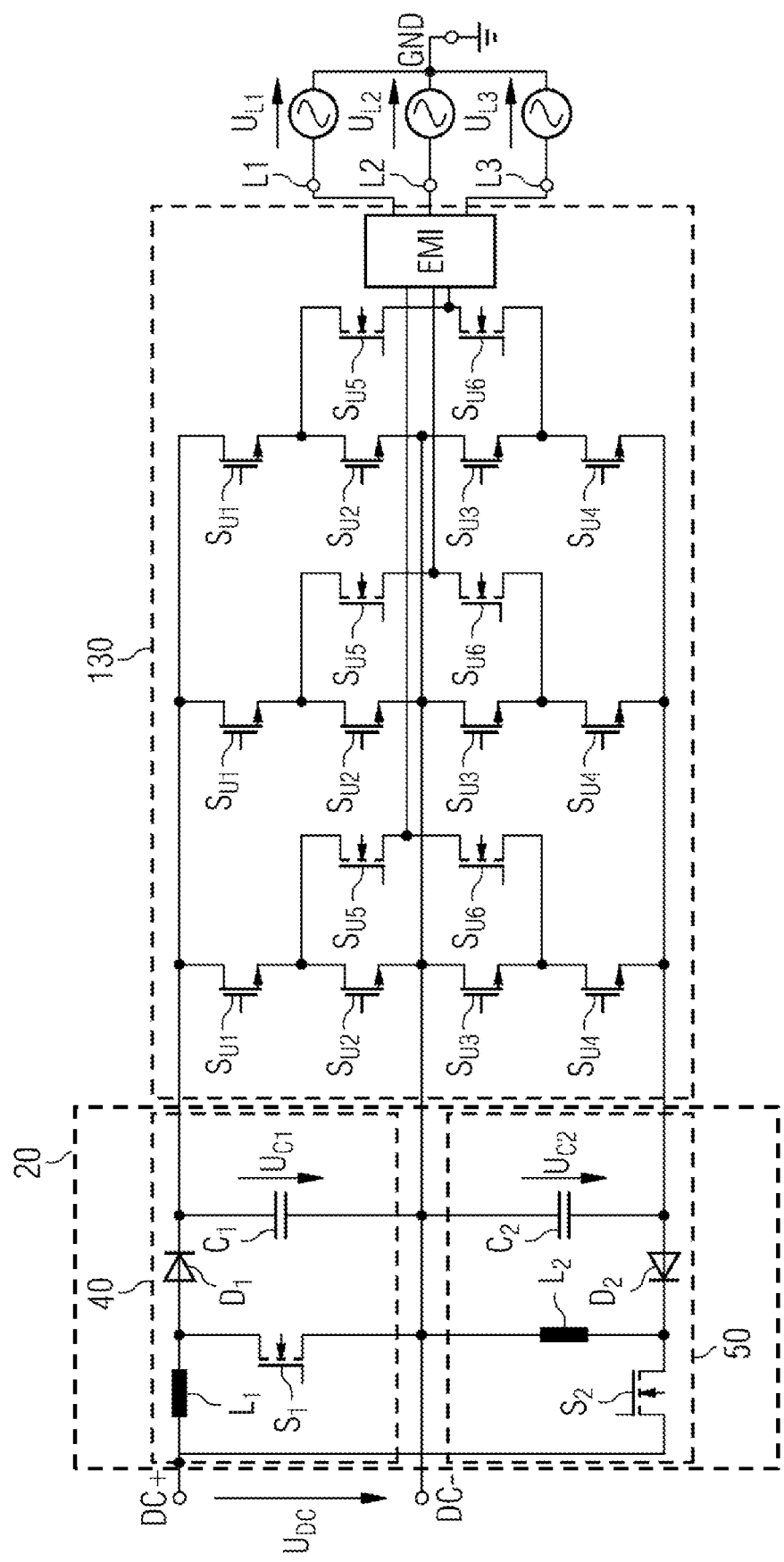
FIG. 3 schematically shows a second exemplary embodiment of the inverter according to an embodiment having a three-phase inverter element in a circuit outline.

Alternatively, the three-level converter 30 may also be configured as a three-phase, three-level converter 130, as shown in accordance with FIG. 3 in the further exemplary embodiment of a further converter according to one or more of the present embodiments.

Figure 4:
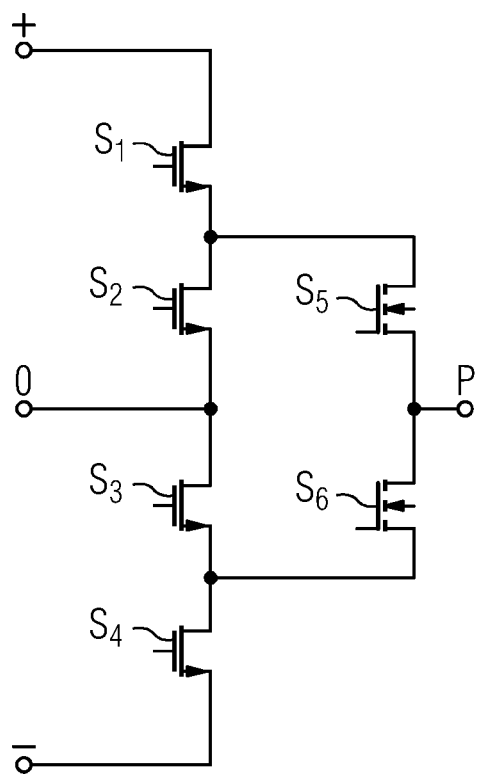
FIG. 4 shows a phase leg of the three-phase inverter element of the inverter in accordance with FIG. 3.

In this case, the phase legs of the three-phase, three-level converter 130 are configured for each phase P in an active neutral point clamped (ANPC) design, and, as shown in FIG. 4, each includes six MOSFETs S1, ... S6 (also denoted $S_{U1}$, ... $S_{U6}$ in the illustration in accordance with FIG. 3).

Figure 5:
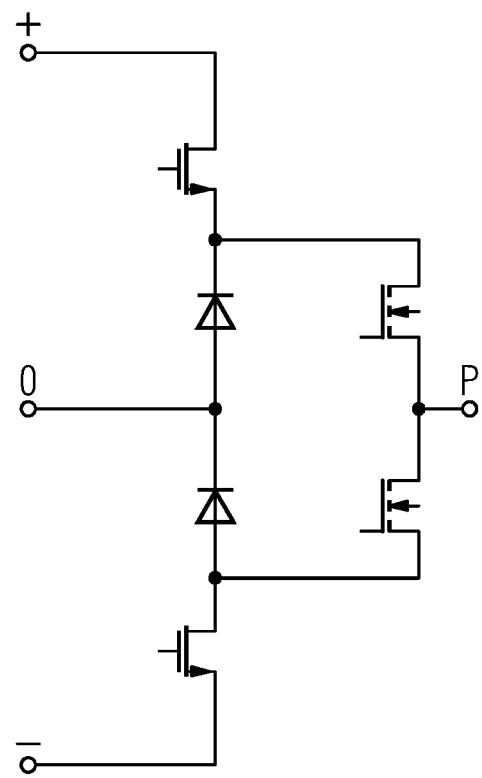
FIG. 5 shows an alternative embodiment to FIG. 4, of a phase leg of a three-phase inverter element of the inverter.

Alternatively, the phase legs of the three-phase, three-level converter 130 may also be configured with phase legs for each phase P in a neutral point clamped (an NPC) design, as depicted in FIG. 5.

Figure 6:
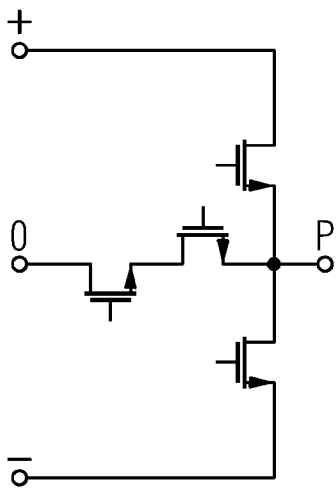
FIG. 6 shows a further alternative embodiment to FIG. 4, of a phase leg of a three-phase inverter element analogously to FIG. 3.

In a further exemplary embodiment, the phase legs of the three-phrase, three-level converter 130 may also be configured with phase legs for each phase P in a 3L-T design, as illustrated in FIG. 6.

Figure 7:
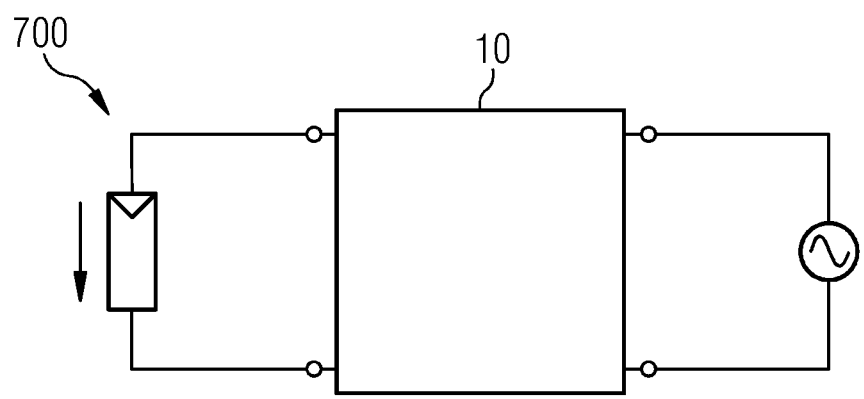
FIG. 7 shows a photovoltaic module according to an embodiment having an inverter in accordance with FIG. 2.

The photovoltaic installation illustrated in FIG. 7 has a photovoltaic module 700 and a micro-photovoltaic inverter 10 that is configured in the manner of the inverter 10 in the first exemplary embodiment, as described above. In further exemplary embodiments, the micro-photovoltaic inverter may be configured in the manner of one of the inverters of the other exemplary embodiments of the inverter according to one or more of the presented embodiments described above.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:
1. An inverter comprising:
a DC-DC converter on an input side of the inverter, the DC-DC converter having three output voltage levels; and
an inverter element having at least three input voltage levels, the inverter element being electrically connected to the DC-DC converter, wherein the DC-DC converter on the input side comprises an inverting DC-DC converter and a non-inverting DC-DC converter, wherein the non-inverting DC-DC converter and the inverting DC-DC converter operate in an interleaved clocking mode, wherein the non-inverting DC-DC converter comprises a boost converter, the inverting DC-DC converter comprises a buck-boost converter, or a combination thereof, and wherein the non-inverting DC-DC converter and the inverting DC-DC converter are jointly fed in parallel by a DC voltage.

2. The inverter of claim 1, wherein the inverter is a micro-photovoltaic inverter.

3. The inverter of claim 1, wherein the inverting DC-DC converter and the non-inverting DC-DC converter are configured for output voltages that differ from one another by not more than twenty percent.

4. The inverter of claim 3, wherein the inverting DC-DC converter and the non-inverting DC-DC converter are configured for output voltages that differ from one another by not more than three percent.

5. The inverter of claim 4, wherein the inverting DC-DC converter and the non-inverting DC-DC converter are configured for output voltages that differ from one another by not more than 0.5 percent.

6. The inverter of claim 1, wherein inputs of the inverting DC-DC converter and the non-inverting DC-DC converter are fed such that the inputs have different polarities and in particular an equal magnitude.

7. The inverter of claim 6, wherein inputs of the inverting DC-DC converter and the non-inverting DC-DC converter are fed such that the inputs have an equal magnitude.

8. The inverter of claim 1, wherein the inverter element includes three phase legs for three-phase output voltages, each of the three phase legs being feedable with three input voltage levels of the at least three input voltage levels.

9. The inverter of claim 8, wherein the three phase legs are configured in or with the ANPC type, NPC type, or 3L-T type.

10. The inverter of claim 1, wherein the inverter element is an extended-ANPC type.

11. The inverter of claim 1, further comprising two DC link capacitors that isolate the three output voltage levels of the DC-DC converter from one another.

12. A photovoltaic installation comprising:
a micro-photovoltaic inverter including an inverter, the inverter including:
 a DC-DC converter on an input side of the inverter, the DC-DC converter having three output voltage levels; and
 an inverter element having at least three input voltage levels, the inverter element being electrically connected to the DC-DC converter,
wherein the DC-DC converter on the input side comprises an inverting DC-DC converter and a non-inverting DC-DC converter,
wherein the non-inverting DC-DC converter and the inverting DC-DC converter operate in an interleaved clocking mode, and
wherein inputs of the non-inverting DC-DC converter and the inverting DC-DC converter are jointly fed in parallel by a DC voltage.

13. The photovoltaic installation of claim 12, wherein the inverting DC-DC converter and the non-inverting DC-DC converter are configured for output voltages that differ from one another by not more than twenty percent.

14. The photovoltaic installation of claim 12, wherein the inputs of the inverting DC-DC converter and the non-inverting DC-DC converter are fed such that the inputs have different polarities and in particular an equal magnitude.

15. The photovoltaic installation of claim 14, wherein the inputs of the inverting DC-DC converter and the non-inverting DC-DC converter are fed such that the inputs have an equal magnitude.

16. The photovoltaic installation of claim 12, wherein the non-inverting DC-DC converter comprises a boost converter, the inverting DC-DC converter comprises a buck-boost converter, or a combination thereof.

17. An inverter comprising:
a DC-DC converter on an input side of the inverter, the DC-DC converter having three output voltage levels; and
an inverter element having at least three input voltage levels, the inverter element being electrically connected to the DC-DC converter,
wherein the DC-DC converter on the input side comprises an inverting DC-DC converter and a non-inverting DC-DC converter,
wherein the non-inverting DC-DC converter and the inverting DC-DC converter operate in an interleaved clocking mode, and
wherein the inverting DC-DC converter and the non-inverting DC-DC converter are configured for output voltages that differ from one another by not more than twenty percent.

* * * * *